US007098422B2

(12) United States Patent
Krink et al.

(10) Patent No.: US 7,098,422 B2
(45) Date of Patent: Aug. 29, 2006

(54) ELECTRODE ELEMENT FOR PLASMA TORCH AND METHOD FOR THE PRODUCTION

(75) Inventors: Volker Krink, Finsterwalde (DE); Frank Laurisch, Finsterwalde (DE); Wolfram Möhler, Freiberg (DE); Gerd Lotze, Dresden (DE); Helmut Löbl, Dresden (DE)

(73) Assignees: Kjellberg Finsterwalde Elektroden & Maschinen GmbH, (DE); Fraunhofer-Gesellschaft zur Forderung der Angewandten Forschung E.V., (DE)

( * ) Notice: Subject to any disclaimer, the term of this patent is extended or adjusted under 35 U.S.C. 154(b) by 0 days.

(21) Appl. No.: 10/506,696

(22) PCT Filed: Mar. 5, 2003

(86) PCT No.: PCT/DE03/00763

§ 371 (c)(1),
(2), (4) Date: Jan. 26, 2005

(87) PCT Pub. No.: WO03/075621

PCT Pub. Date: Sep. 12, 2003

(65) Prior Publication Data

US 2005/0161443 A1 Jul. 28, 2005

(30) Foreign Application Priority Data

Mar. 6, 2002 (DE) ................................ 102 10 421

(51) Int. Cl.
*B23K 10/00* (2006.01)

(52) U.S. Cl. ........................... 219/121.52; 219/121.48; 219/119; 219/75

(58) Field of Classification Search ........... 219/121.52, 219/121.48, 121.59, 121.39, 121.45, 74, 219/75, 119; 313/231.31; 315/111.51
See application file for complete search history.

(56) References Cited

U.S. PATENT DOCUMENTS

| | | | | |
|---|---|---|---|---|
| 5,023,425 | A * | 6/1991 | Severance, Jr. | 219/121.59 |
| 5,041,711 | A * | 8/1991 | Prucher | 219/119 |
| 5,767,478 | A | 6/1998 | Walters | 219/121.52 |
| 6,130,399 | A * | 10/2000 | Lu et al. | 219/121.59 |
| 6,420,673 | B1 * | 7/2002 | Nemchinsky | 219/121.52 |

FOREIGN PATENT DOCUMENTS

| | | | |
|---|---|---|---|
| EP | 0334981 | | 10/1989 |
| EP | 0437915 | | 7/1991 |
| EP | 0437915 | A2 * | 7/1991 |

OTHER PUBLICATIONS

Copy of International Search Report dated Aug. 25, 2003.

* cited by examiner

*Primary Examiner*—Mark Paschall
(74) *Attorney, Agent, or Firm*—Young & Basile, P.C.

(57) ABSTRACT

An electrode element for plasma torches and a production method for such electrode elements. The electrode element for plasma torches includes at least one core made of a metal or a metal alloy having a smaller work function that forms the actual electrode connected as a cathode. This core is enclosed by a shell part, which is made of a metal or a metal alloy having a greater work function than the core and a greater thermal conductivity. Between the core surface and the shell part there is provided a boundary layer in a graded form, which is made up of solid solutions of the two metals or metal alloys, or an intermediate layer toward the core surface and toward the shell part, which is made of another metal or a metal alloy having a work function greater than that of the core material wherein the boundary layers of the intermediate layer form a graded transition.

22 Claims, No Drawings

ELECTRODE ELEMENT FOR PLASMA TORCH AND METHOD FOR THE PRODUCTION

BACKGROUND

The invention relates to an electrode element for plasma torches as well as a production method for such electrode elements. Such an electrode element is particularly suitable for plasma cutting in which oxygen is used as a plasma gas.

Such electrodes are very highly stressed thermally and electrically when used in plasma torches such that they only achieve limited service lives, and an expensive replacement of electrodes is required in more or less long time intervals.

In particular, the high thermal load caused by temperatures of up to 50,000 K requires an appropriate design and a suitable selection of the materials used for such an electrode.

Thus, up to now for plasma cutting using oxygen as a plasma gas, electrodes substantially made up of hafnium are employed with a melting temperature in the range of 2220° C. Hafnium has a low work function in contrast to many other electrically conducting metals such that it is especially appropriate for the application.

As a rule, such pencil-shaped hafnium electrodes having a copper socket are used, and at the same time use is made of the high thermal and electrical conductivity of copper.

However, having such a formation the electrical anodic corrosion (electromigration) and diffusion, which increases the transition resistance between the hafnium and copper, has to be kept small.

In particular during plasma cutting with oxidizing gases such as the already mentioned oxygen, oxidation occurs with the copper such that this has a bad influence on the thermal conductivity and the electrical transition resistance between the copper and hafnium.

Due to the high anodic corrosion and oxidation, the result is an increased power conversion at the boundaries between the hafnium and the copper such that the aging processes proceed in an accelerated manner.

Because of the enhanced formation of copper oxide on the copper sheath at higher temperatures in close proximity of the hafnium core, the work function of copper is decreased, and, accordingly, copper electrons can also emit out of it. Because of this emission, it may result in local fusing of the copper and accordingly in an unserviceability of such a plasma electrode.

According to the prior art, silver or a silver alloy are used to counteract these problems. Silver has also good thermal and electrical conductivities as well as a higher work function. In particular, the oxide formation with silver is less in contrast to copper at higher temperatures.

An equivalent solution is described in EP 0 980 197 A2. On that occasion, a copper holder finds use into which a silver sleeve made of a selected silver alloy and having a closed bottom facing into the interior of the copper holder is pressed into a receptacle formed as a blind hole.

Then, a pencil-like electrode made of hafnium is again pressed into this silver sleeve.

Such a structure has several disadvantages. This concerns the expensive production, on the one hand, during which the individual elements have to be fabricated separately and partially by metal cutting. The three individual parts have then to be joined together into one element wherein high demands have to be met upon joining and handling because of the relatively small-sized silver sleeve and the hafnium pin. In addition, mechanical pressing of the silver sleeve and the hafnium pin has to be carried out very carefully.

Nevertheless, merely a locally limited contact between the copper, silver and hafnium can be achieved such that in particular these spot-shaped contacts have an adverse effect with respect to the anodic corrosion already mentioned, and, of course, the thermal conductivity is correspondingly negative influenced as well.

Accordingly, with such a solution the service life is negligibly increased in contrast to electrodes that were previously known, and the service life increase for such electrodes used for plasma torches is largely compensated due to significantly higher production costs.

Therefore, it is desirable to propose electrode elements for plasma torches as well as a suitable production method in which the production costs can be reduced with a simultaneous increase of the service life.

SUMMARY

According to the invention, an electrode element and a method for the production of same are disclosed.

DETAILED DESCRIPTION

The electrode element for the plasma torches as a matter in question comprises at least one core made of a metal or a metal alloy having a work function smaller than a metal or metal alloy from which a shell part enclosing at least the one core wherein the one core or even a plurality of cores form the actual electrode connected as a cathode.

Between the different materials, i.e., between the core surface and the shell part, in an inventive alternative, there is a boundary layer provided in a graded form which is formed from solid solutions of the respective metals and/or metal alloys.

In a second alternative for an electrode element an intermediate layer made of another metal or a metal alloy having a work function greater than that of the core material is provided between the core surface and the shell part material wherein the intermediate layer forms a graded transition towards the core and shell part in the form of correspondingly formed boundary layers. Hafnium or a hafnium alloy is a material particularly appropriate for the core, in which the portion of alloy components should be kept relatively small.

In addition to hafnium and the alloys thereof, tungsten, zirconium or tantalum and alloys of these elements can be used as core materials.

Copper or a copper alloy is one material for the shell part.

The intermediate layer can possibly be formed from silver or a silver alloy.

The boundary layers existing in an electrode element which form each of the graded transitions of the different materials are not available with the solutions known from the prior art such as with that one described in EP 0 980 197 A2 since this is not possible constructively and inherently in production.

Surprisingly, it turned out that the electrode elements according to the invention can be manufactured simply and very reasonably by means of a forming method and/or a joining process using compressive forces (pressing forces) wherein the equivalent boundary layers having graded transitions can be formed without any additional technological processing steps. Extrusion molding or hot isostatic pressing are particularly suitable methods.

Thus, the formation of solid solutions in a boundary layer between the denoted core material and shell part material (e.g., Cu and Hf) has not readily been expected automatically since the difference between the respective melting temperatures of the two metals used for this is significant and amounts to approximately 1000 K. With the solution according to the invention solid solutions made of copper and hafnium can be formed according to an alternative of an electrode element according to the invention with abandonment to an intermediate layer such that a graded transition, in particular for the electrical conductivity and the thermal conductivity can be achieved not only punctually but over the entire surface to be available.

As the primary products for one core or else multiple cores, the shell part and/or an intermediate layer bar-shaped, wire-shaped or sleeve-shaped elements made of the respective metals or metal alloys can be used, which are then worked into an electrode element according to the invention by means of extrusion molding.

However, it is also possible to employ the respective metal or metal alloy in powder form for these elements. For the formation of the intermediate layer use of powdery silver is particularly favourable. Thus, the spacing between a sleeve-shaped copper part and at least one bar-shaped or wire-shaped element forming the core can be filled with a silver powder, and the appropriate intermediate layer can form with a respective graded transition towards the core surface and towards the shell part due to compressing forces, which have an effect during extrusion molding. In the boundary layers a mixing zone obtainable by means of the individual granules of the powdery starting material will be formed from the respective two metals or metal alloys, which mixing zone is homogeneous over the entire available surface.

Another possibility is in that appropriate powders are used for the core and shell part as well. The starting powders used can then be fabricated by means of compression molding, preferably cold isostatic pressing each individually and successively one after another into primary products ensuring a sufficient strength for the subsequent extrusion molding process, and subsequently an electrode element according to the invention can be formed by extrusion molding.

For the one core or a plurality of cores, bar-shaped elements having a circular cross-section can be employed as a primary product.

However, it is also possible to employ such elements having a circular cross-section that are hollow in the interior, and accordingly shaped as a sleeve. This cavity can then be filled again before extrusion molding with a powder of a metal or a metal alloy that has a work function being higher than that of the core material.

However, for the formation of the cores forming the actual electrodes, elements can also be used, the cross-sections of which are star-shaped. Such a star-shaped element can have three or even a plurality of cross-pieces oriented in equal angular distances to each other. As a result, an enlargement of the respective transition surfaces having the low electrical and thermal transition resistances connected therewith between the core and shell part and boundary layer, respectively, is obtainable.

However, a core can also be formed from a plurality of wire-shaped elements twisted with each other, similar to stranded wires which are frequently used with electric lines. A core thus formed by drilling of wire-shaped elements enlarges the contact surface and simultaneously the advantageous graduating effect as well.

If several cores should be available with an electrode element according to the invention, it is advantageous to arrange the electrodes in a discrete and equidistant manner to each other, wherein the electrodes are embedded each into the shell part material using interposition of an intermediate layer, as the case may be.

Advantageously, before the extrusion molding preheating up to a temperature of at least 400° C. should be carried out to reduce the stress of the extrusion molding tool, in particular. However, such preheating has also a positive effect on the formation of solid solution and diffusion processes, which thus can take place almost certainly with the relatively high compressive forces acting simultaneously during the extrusion molding. An electrode element according to the invention provides low thermal and electrical transition resistances as a result of the more intimate contact with the graded transitions of the different metals and/or metal alloys of the individual elements such that it can counteract the problem of anodic corrosion, and the service life can be increased significantly. Accordingly, not only the production costs for the electrode elements as such but also the running costs of a correspondingly equipped plasma torch are significantly reduced to the final user.

Also the electrode elements produced with the method according to the invention in which intermediate layers made of silver or silver alloys are employed can be produced cost-effective since such intermediate layers can be formed with a significantly lower layer thickness such that the expensive use of silver can be accordingly reduced.

As already intimated, a sleeve-shaped copper element can be used for the formation of a shell part. At the same time, at least one rod-shaped element for example made of hafnium and extending over the entire length of the copper sleeve can be introduced in the interior thereof. As a result, such a copper sleeve can have an outer diameter of 12 mm, for example, and the free cross-section in the interior of such a copper sleeve can have a diameter of 1.5 mm. After appropriately preheating, a section for electrode elements according to the invention is then produced by means of extrusion molding. The section merely has to be cut to length, and other joining and assembly processes are not necessary anymore. An electrode element thus obtained has to be inserted into an appropriate plasma torch wherein such a plasma torch can also be formed so that a certain part of such an electrode element arranged inside of the plasma torch can be immediately passed by a cooling agent for dissipating heat.

However, instead of a rod-shaped hafnium element several hafnium wires preferably being twisted with each other can be introduced into such a copper sleeve wherein the inner diameter of the copper sleeve and the greatest extension of such a core type preliminary element should be dimensioned such that a space remains, which space can be filled with a silver powder or a silver powder alloy.

Such a silver powder forming an intermediate layer should also be employed, if possible, when a core does not have the shape of a rotationally symmetric cross-section, or when a sleeve-shaped core is to be formed.

However, for example, it is also possible for a rod-shaped element made of hafnium to be provided on its outer surface towards the shell part material with a layer of silver formed substantially from silver powder. Such a powder can be deposited in the form of a suspension and be solidified on the surface of the rod-shaped hafnium element, for example, such as by means of compression molding or can be subjected to sintering. Then, in the last mentioned case, in the suspension containing the silver powder an organic binding agent can be included, which binding agent can be expelled thermally upon sintering.

A rod-shaped element provided with such a silver layer can then be introduced into a sleeve-shaped copper element again, and thus an electrode element according to the invention can be produced by means of extrusion molding.

However, the electrode element according to the invention can also be improved in that in order to allow this to be connected with a sleeve-shaped element by the formation of a respective contour wherein preferably an external thread can be chosen. Such a sleeve-shaped element, which is preferably made of copper, can then be repeatedly used again, and thus merely replacement of the correspondingly smaller dimensioned electrode element is required in more or less great intervals. As a result, the electrode element is screwed into a sleeve-shaped element and screwed out of it, respectively, with the thread formed on its outer shell surface as a contour shape.

Since a high thermal load takes place as already mentioned above, and since intensive cooling is required, the element according to the invention can also be formed and produced such that a single-sided open cavity has been formed within the shell part. This cavity can be combined with the filling system of a plasma torch such that the cooling medium, such as water, for dissipating heat can immediately pass into this cavity.

Advantageously, the formation of such a cavity can be formed by means of backward extrusion. With this method it is possible to avoid metal cutting as well. Backward extrusion is a subsequent processing step on an electrode element, the production of which has been previously described. At the same time an electrode element is manufactured as a primary product the length of which is kept shorter than the finished electrode element having the cavity, and the outer diameter of which is kept greater than that. Upon the backward extrusion, a tool with a mandrel predetermining the shape and size of the respective cavity is used, and almost solely the shell part made of copper is worked because of the significantly higher rheological properties.

The invention claimed is:

1. An electrode element for plasma torches comprising:

at least one core forming an electrode connected as a cathode, the core made of one of a metal and a metal alloy having a smaller work function enclosed by a shell part made of one of a metal and a metal alloy having a greater work function and thermal conductivity, and a boundary layer between a core surface and said shell part formed in a graded shape of solid solutions of the two metals or metal alloys, or an intermediate layer formed from another one of a metal and a metal alloy having a work function greater than that of said core material formed toward said core surface and toward said shell part with boundary layers in a graded transition.

2. An electrode element according to claim 1, characterized in that said core is formed from one of hafnium and a hafnium alloy.

3. An electrode element according to claim 1, characterized in that said core is formed from one of tungsten, zirconium, tantalum and an alloy thereof.

4. An electrode element according to claim 1, characterized in that said shell part is formed from one of copper and a copper alloy.

5. An electrode element according to claim 1, characterized in that said intermediate layer is formed from one of silver and a silver alloy.

6. An electrode element according to claim 1, characterized in that said core is rod-shaped with a circular cross-section.

7. An electrode element according to claim 1, characterized in that said core includes a plurality of wire-shaped elements twisted with each other.

8. An electrode element according to claim 1, characterized in that said core comprises one of a star-shaped cross-section, an annular cross-section and a cross-shaped cross-section.

9. An electrode element according claim 1, characterized in that several cores arranged separately form said electrode.

10. An electrode element according to claim 1, characterized in that said intermediate layer is formed from a powder.

11. An electrode element according to claim 1, characterized in that a single-sided open cavity connected to a cooling element is within said shell part.

12. An electrode element according to claim 1, characterized in that said electrode element is replaceably connected to a sleeve-shaped portion of copper.

13. A method for the production of an electrode element for plasma torches comprising the steps of:

manufacturing said electrode element by applying compressive forces using one of a shaping method and a joining method using a sleeve-shaped part which forms a shell part made of one of a metal and a metal alloy having a higher work function and a higher thermal conductivity and electrical conductivity; and introducing at least one core element made of one of a metal and a metal alloy having a lower work function which forms said electrode and is connected as a cathode into the shell part.

14. A method according to claim 13 wherein the step of manufacturing said electrode comprises the steps of:

manufacturing said electrode element by one of extrusion molding and hot isostatic pressing.

15. A method according to claim 14 further comprising the step of:

preheating at least up to 400° C. before extrusion molding.

16. A method according to claim 14 further comprising the step of:

before extrusion molding, filling a cavity between said sleeve-shaped part and said core element for the formation of said intermediate layer with one of a powdery metal and a metal alloy having a work function, thermal conductivity and electrical conductivity higher than said core material.

17. A method according to claim 13 further comprising the step of:

twisting several wire-shaped elements with each other for the formation of said core.

18. A method according to claim 14 further comprising the step of:

before extrusion molding, filling a cavity of said core element formed in said sleeve shape with one of a metal powder and a metal alloy which has a work function being higher than said core material.

19. A method according to claim 13 further comprising the steps of:

forming said shell part, said core and said intermediate layer as one common primary product each from a powder by compression molding; and manufacturing said electrode element by extrusion molding.

20. A method according to claim 13 further comprising the steps of:

manufacturing at least one of said sleeve-shaped part and said at least one core element by cold isostatic pressing.

21. A method according to claim 13 comprising the steps of:

forming a contour on an outer circumferential surface of said shell part for a positive joint with a sleeve-shaped copper part.

22. A method according to claim 13 further comprising the step of:

forming a single-sided open cavity within said shell part by backward extrusion.

* * * * *